United States Patent [19]

Vetter

[11] Patent Number: 5,312,304
[45] Date of Patent: May 17, 1994

[54] CONVERTIBLE SPROCKET FOR MOTION PICTURE FILM

[75] Inventor: Richard Vetter, Pacific Palisades, Calif.

[73] Assignee: United Artists Entertainment, Los Angeles, Calif.

[21] Appl. No.: 978,250

[22] Filed: Nov. 18, 1992

[51] Int. Cl.⁵ .................. F16H 55/12; B41J 11/27
[52] U.S. Cl. ..................... 474/160; 226/79; 352/241; 474/164
[58] Field of Search .............. 474/77, 84, 152, 153, 474/164, 160, 184–187; 198/782, 834, 842; 226/79; 242/209; 352/241

[56] References Cited

U.S. PATENT DOCUMENTS 4,729,682  3/1988  Morita ...................... 226/79 X
4,900,393  2/1990  McLendon .................. 474/152

FOREIGN PATENT DOCUMENTS 2347028  3/1975  Fed. Rep. of Germany ........ 226/79

*Primary Examiner*—Douglas D. Watts
*Attorney, Agent, or Firm*—Poms, Smith, Lande & Rose

[57] ABSTRACT

A convertible sprocket for film and like media accommodates different media formats. The sprocket includes a first sprocket wheel support and a first sprocket wheel having a first dimension and supported by the sprocket wheel support. A second sprocket wheel support is co-axial with the first sprocket wheel support. A second sprocket wheel having a second dimension different from the first dimension is supported by the second sprocket wheel support. The second sprocket wheel is axially movable relative to the first sprocket wheel support so that the first sprocket wheel engages the medium when the second sprocket wheel is in a first position relative to the first sprocket support. The second sprocket wheel engages the medium when the second sprocket wheel is in a second position relative to the first sprocket support. The convertible sprocket has a plurality of axially spaced apart sprocket wheel wherein at least two of the sprocket wheels have different diameters.

18 Claims, 3 Drawing Sheets

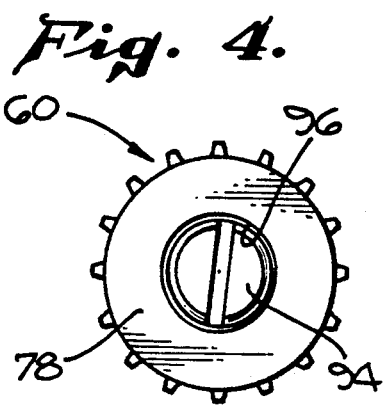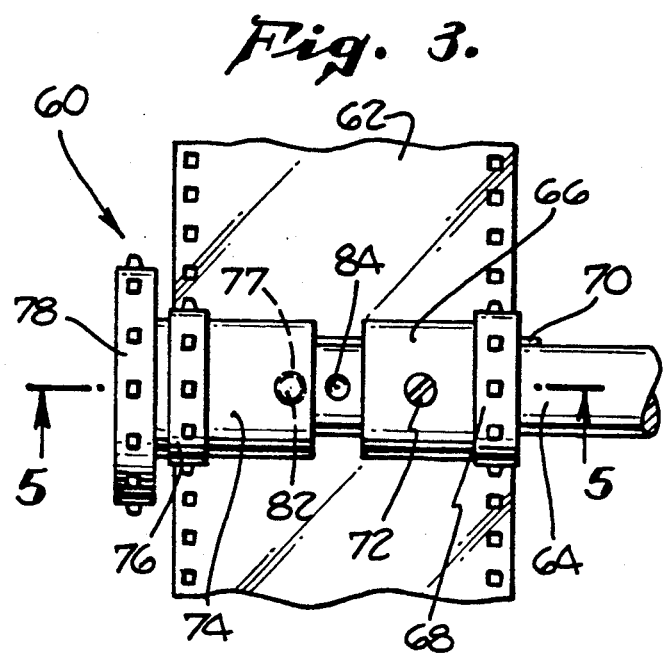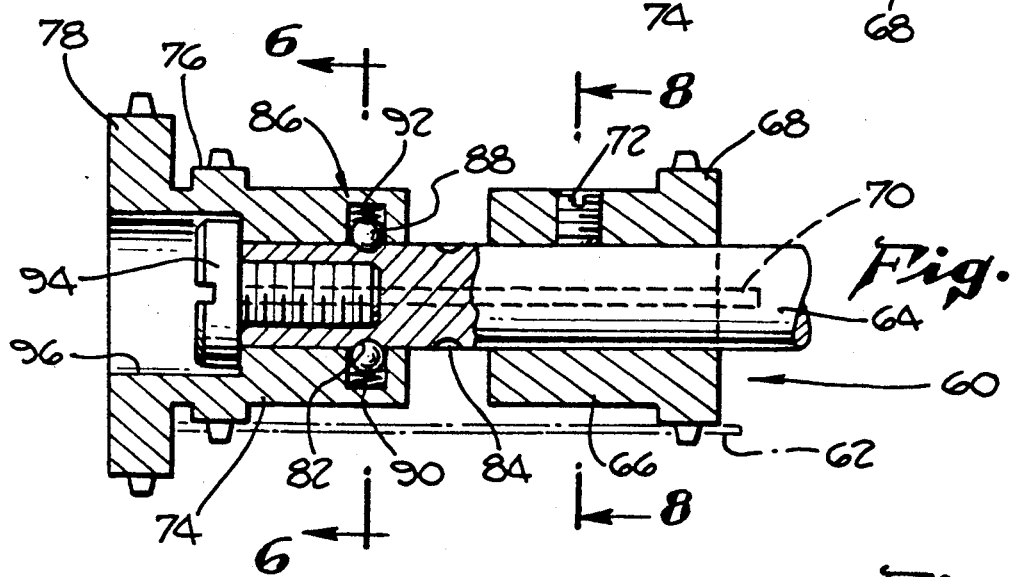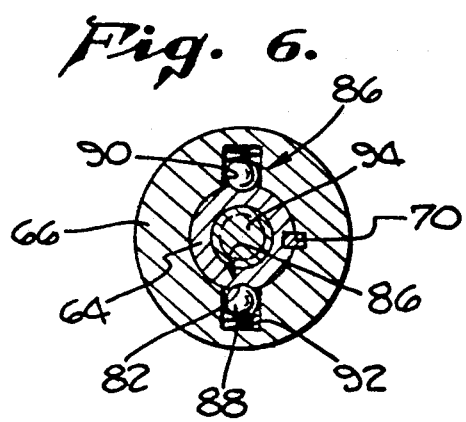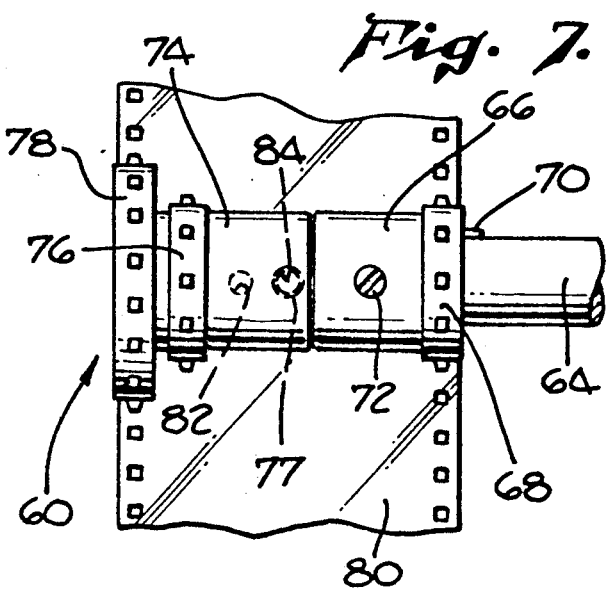

CONVERTIBLE SPROCKET FOR MOTION PICTURE FILM

BACKGROUND OF THE INVENTION

1. Field of The Invention

The present invention relates to convertible sprockets for film and other media for accomodating different media formats, and more specifically to a convertible sprocket which can accommodate more than one format, such as more than one frame pitch for the medium.

2. Related Art

Conventional 35 mm film cameras and projectors operate with 35 mm film having a film frame pitch of four perforations per frame. The film is transported at a rate of 24 frames per second and 90 feet per minute. Film recording and projection equipment have long been standardized to operate with the four perforation frame pitch for 35 mm film. Therefore, equipment such as projectors use sprockets and pull-down assemblies specifically designed to operate with 35 mm film having four perforation frame pitch. The sprockets for conventional 35 mm film have 16 teeth around the circumferential surfaces. The frame pitch is 0.748 inches and the corresponding sprocket diameter for a 16 tooth sprocket is 0.952 inches.

Efforts have been made recently to more efficiently use available film stock by putting more film frames in a given unit length of film stock. One proposal has been to convert from a 4 perforation film frame pitch to a 3 perforation film frame pitch to eliminate 25 percent of unused film stock. Other film frame pitches and formats have also been proposed. To accommodate these different film formats and still project the film at a frame rate of 24 frames per second, according to the North American Standard, the projection and other film handling equipment must be modified to accommodate the changed format. It is believed that more than one frame pitch for motion picture equipment will be adopted by the film industry. While the standard Edison frame pitch of 4 perforations will remain useful, other intermittent pull-down pitches will be used to meet specific needs, such as presentation quality, economy, or efficiency. For example, possible additional film formats may require picture frames having perforation pitches of 5 perforations, 3 perforations, 2½ or 2 perforations. However, changing from one film format to another for a given piece of equipment such as a projector is a time consuming and tedious process. Moreover, once a given piece of equipment is converted, the previous 4 perforation frame pitch can no longer be used with the equipment unless the sprocket assemblies and other components are reconverted. Conversion back and forth between the standard 4 perforation frame pitch and any modification will be necessary if more than one film format is to be accommodated in a projector or other piece of equipment. According to one approach, sprockets and other components of a projector or other piece of equipment for a given film format can be maintained on hand so that the projector can be converted at will. However, the conversion is a time consuming process, to be accomplished by film projectionists who would have to be trained to accomplish the conversion. Additionally, maintaining a complete set of conversion components may prove difficult because of possible loss or damage during the conversion process or while the equipment is being stored.

In an alternative approach, a sprocket conversion assembly may be used which has an outer cylindrical sleeve with teeth for engaging film perforations when the film is run according to one format and an inner cylindrical sleeve to fit within and anti-rotationally mate with the outer cylindrical sleeve. The inner sleeve has teeth for engaging film perforations according to an alternative format. Such an arrangement may permit less time consuming and costly conversions from one film format to another. However, separate parts are still required and the outer sleeve may be lost or damaged when not in use. Additionally, engagement of the tines on the inner sleeve with mating grooves on the inside of the outer sleeve may wear the tines of the inner sleeve, which may adversely effect film transport when using the inner sleeve.

There is a need, therefore, for a convertible sprocket which can be used to convert a given piece of equipment from one film format to one or more other film formats. Preferably, such a convertible sprocket is a single component which can accommodate the two or more film formats without having to store or remove additional equipment. the convertible sprocket is preferably easy to use and easily retrofit onto current equipment.

SUMMARY OF THE INVENTION

In accordance with the present invention, a convertible sprocket is provided which can convert a given piece of equipment back and forth from one film format to one or more other film formats conveniently and quickly. The convertible sprocket of the present invention is easy to install and use, and does not require special training for use on conventional equipment such as projectors and the like. In accordance therewith, a convertible sprocket includes a first sprocket wheel having a first dimension supported by a first sprocket wheel support and a second sprocket wheel having a second dimension different from the first dimension supported by a second sprocket wheel support wherein the second sprocket wheel is axially movable relative to the first sprocket wheel support. Preferably, the first sprocket wheel engages the film or other medium when the second sprocket wheel is in a first position relative to the first sprocket support and the second sprocket wheel engages the medium when the second sprocket wheel is in a second position relative to the first sprocket support.

With the convertible sprocket of the present invention, a single assembly can accommodate two or more film formats without having to replace or exchange equipment. With the convertible sprocket of the preferred embodiment, up to three film formats can be accommodated. Portions of the convertible sprocket need not be exchanged, removed or otherwise stored apart from the rest of the assembly, and thereby subject to loss or damage.

In a preferred embodiment, the convertible sprocket includes detents for releasably fixing the second sprocket wheel relative to the first sprocket wheel support. In one embodiment, one or more detents are provided for releasably holding the second sprocket wheel fixed relative to the first sprocket wheel support so that the first sprocket wheel engages a medium and so that the second sprocket wheel is held out of engagement with the medium. In a second configuration, the detent releasably holds the second sprocket wheel relative to the first sprocket wheel support, after movement relative to the first sprocket wheel support so that the second sprocket wheel can engage a medium of a format different from the first medium and so that the first sprocket wheel is held out of engagement with the medium of the second format. In one specific embodiment, the first sprocket wheel is provided with a matching sprocket wheel of the same dimensions, such as for 35 mm film, and includes ten teeth for engaging film having a film frame pitch of 2.5 perforations per frame. The second sprocket wheel may also include an additional matching sprocket wheel having dimensions the same as the corresponding second wheel with 16 teeth to accommodate 35 mm film having a standard film frame pitch of 4 perforations per frame. In another preferred embodiment, a third pair of matched sprocket wheels having diameters greater than the diameters of the first and second sprocket wheel pairs are dimensioned and have 20 teeth for accommodating 70 mm film.

In an alternative embodiment, a convertible sprocket is provided for accommodating different media formats having a plurality of axially spaced apart sprocket wheels wherein at least two of the sprocket wheels have different diameters. In the preferred configuration, the sprocket wheels are axially movable relative to each other to position different ones of the sprocket wheels to separately engage respective media according to the particular format of the medium.

In accordance with the foregoing, it is a principal object of the present invention to provide a convertible sprocket in a single assembly.

It is a further object of the present invention to provide a convertible sprocket which is easy to use and requires no special skills to install, retrofit or operate.

It is an other object of the present invention to provide a convertible sprocket assembly which does not require removal of disassembly of any parts to convert from one film format to another.

It is another object of the present invention to provide a convertible sprocket which reduces any excessive film or equipment wear during use.

It is a further object of the present invention to provide a convertible sprocket which can accommodate two or more film formats, such as for picture frames whose heights correspond to 5 perforations, 4 perforations, 3 perforations, 2½ perforations or 2 perforations.

These and other objects of the present invention will become apparent by consideration of the drawings, a brief description of which is provided below, as well as the detailed description of the preferred embodiments to follow.

BRIEF DESCRIPTION OF THE DRAWINGS

FIG. 3 is a convertible sprocket assembly according to a further embodiment of the present invention in an open position and having a first set of matching sprocket wheels engaging a film medium having a first film format.

FIG. 4 is a side elevation view of the sprocket assembly of FIG. 3 according to the view from the left side of FIG. 3.

FIG. 5 is a partial longitudinal cross-sectional view of the sprocket assembly of FIG. 3 taken along line 5—5 of FIG. 3.

FIG. 6 is a transverse cross-sectional view of the convertible sprocket assembly of FIG. 3 taken along line 6—6 of FIG. 5 showing the detent mechanism.

FIG. 7 is a plan view of the convertible sprocket assembly of FIG. 3 showing the sprocket assembly in a closed configuration for engaging a film medium having a second film format.

DETAILED DESCRIPTION OF THE PREFERRED EMBODIMENTS

Figure 1:
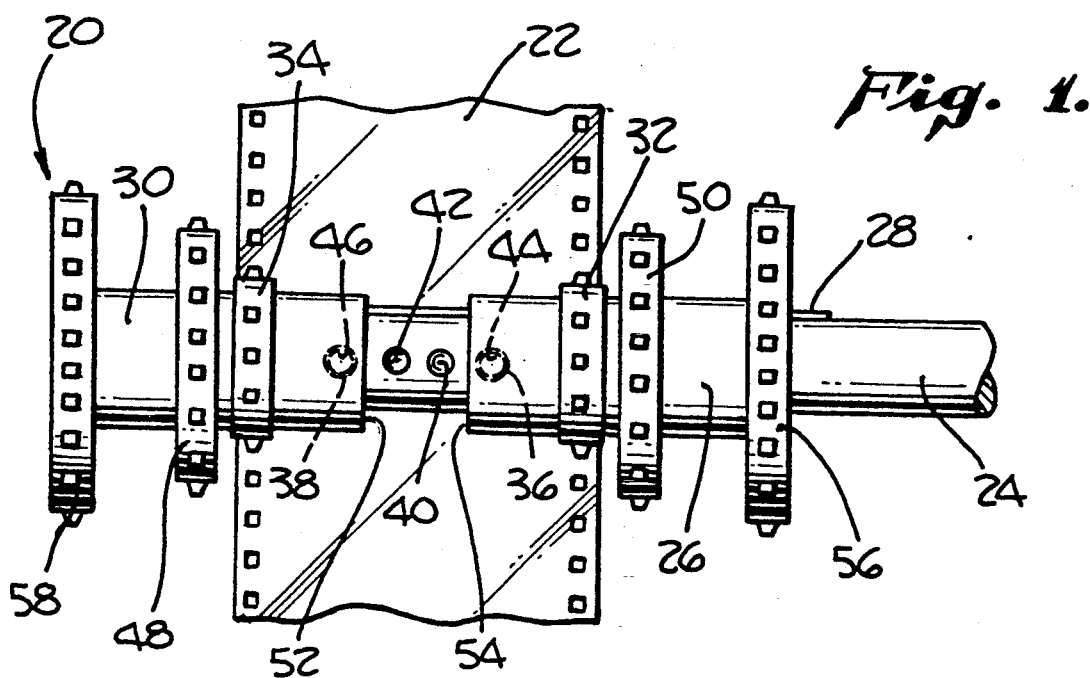
FIG. 1 is a plan view of a convertible sprocket assembly shown in an open configuration with a film medium in accordance with one aspect of the present invention.
Figure 8:
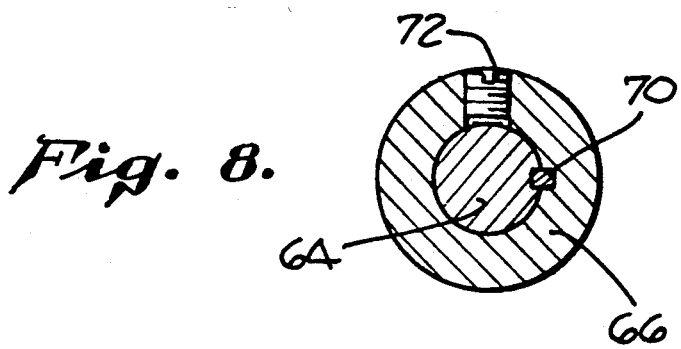
FIG. 8 is a transverse cross-sectional view of the convertible sprocket assembly of FIG. 3 taken along line 8—8 of FIG. 5.
Figure 2:
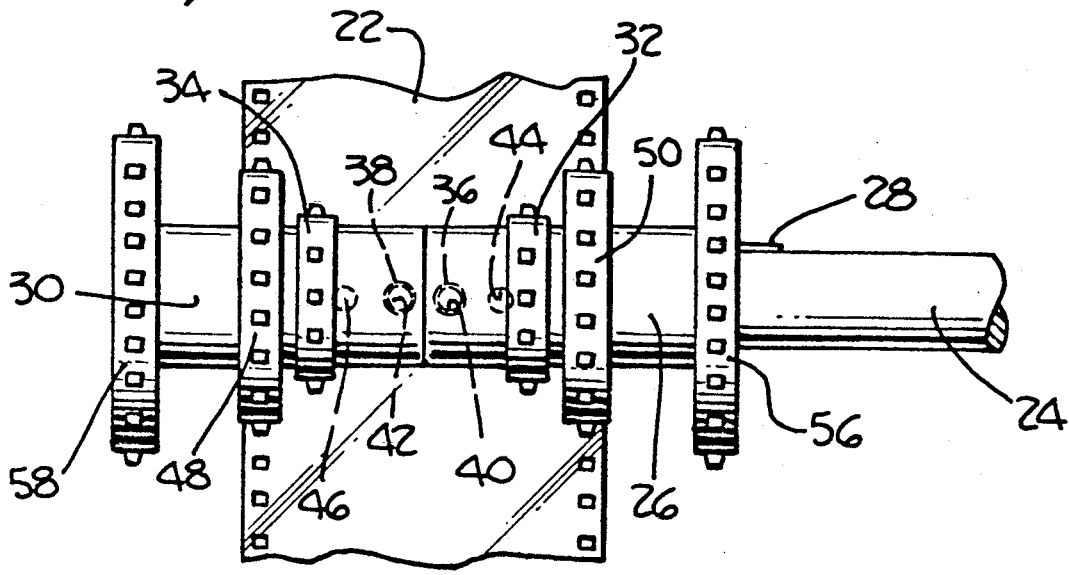
FIG. 2 is a plan view of the convertible sprocket assembly of FIG. 1 shown in a closed configuration for engaging a second set of sprocket wheels with a film medium of a second format.

A convertible sprocket for film and like media is disclosed for accommodating different media formats and which is self-contained, easy to use and requires no special skills for installation, retrofitting or use, which requires no disassembly or removal of separate pieces for use or storage and which reduces excessive film or equipment wear during use or storage. In accordance with one aspect of the present invention, a first convertible sprocket assembly 20 (FIGS. 1 and 2) is shown for use in conjunction with a projector or other equipment (not shown) for handling film media such as the film strip 22. The film strip 22 may have one of any number of film formats, such as film formats having picture frames whose heights are 5 perforations, 4 perforations, 3 perforations, 2½ perforations, 2 perforations or 1 set of perforations. For example, 16 mm film uses 1 pair of perforations on each side of the film strip for each film frame. Conventional 35 mm film has a film frame pitch of 4 perforations per frame. Other purposed formats include 35 mm film having film frame pitches of 3 perforations per frame. Combinations of up to three of these film formats can be accommodated using the convertible sprocket assembly of the present invention. FIGS. 1 and 2 show the sprocket assembly 20 which can accommodate three different film formats.

In the preferred embodiment, a conventional sprocket support shaft 24 is modified to accommodate the movable sprockets according to the present invention. The shaft is made sufficiently long to accommodate both 35 mm formats and 70 mm film formats. The shaft 24 slidingly accepts a first sprocket wheel support or sleeve 26 co-axial with and axially slidable relative to the shaft 24. The first sprocket wheel sleeve 26 is rotationally fixed relative to the shaft 24 by a key 28 engaging corresponding key ways in the shaft 24 and in the corresponding sprocket wheel sleeve 26. A second sprocket wheel sleeve 30 is similarly mounted to the shaft 24 so that the second sprocket wheel sleeve is supported by and can move axially relative to the shaft and also relative to the first sprocket wheel sleeve 26. The second sprocket wheel sleeve 30 is rotationally fixed relative to the shaft by the key 28 engaging the corresponding key way in the second sleeve 30 in the shaft 24. The sprocket wheel supports are prevented from removal by a flange screw (not shown in FIGS. 1 and 2) discussed more fully below with respect to the embodiments of FIGS. 3-8.

In the preferred embodiment, the convertible sprocket assembly includes one or more detent mechanisms for releasably retaining each sprocket wheel sleeve on the shaft in a given position so that a selected sprocket wheel or sprocket wheels can engage the film strip, while at the same time permitting repositioning of one or both of the sprocket wheel sleeves relative to the other so that a different sprocket wheel or sprocket wheels can be positioned to engage a film strip having a different film format. In the embodiment shown in FIGS. 1 and 2, the first sprocket wheel sleeve 26 includes a first sprocket wheel 32 having a first dimension or diameter for engaging the film strip 22. In the embodiment shown in FIGS. 1 and 2, the first sprocket wheel 32 is a 10 tooth sprocket wheel for engaging film having a film frame pitch of 2.5 perforations per frame. The sprocket wheel has the dimensions shown in Table I. Additionally, the second sprocket wheel sleeve 30 includes an additional first sprocket wheel to match the first sprocket wheel 32 on the first sprocket wheel sleeve 26 for engaging the same film strip.

The first sprocket wheel sleeve 26 includes a detent mechanism 36 for releasably maintaining the first sprocket wheel sleeve 26 and therefore the first sprocket wheel fixed relative to the shaft 24 and also relative to the second sprocket wheel sleeve 30. The shaft 24 includes a pit or other surface (not shown) for engaging the detent mechanism 36 and thereby retaining the first sprocket wheel 32 and its sleeve 26 axially fixed relative to the shaft 24.

The second sprocket wheel sleeve 30 also includes a corresponding detent mechanism 38 for releasably retaining the second sprocket wheel sleeve 30 fixed relative to the shaft 24. The shaft 24 includes a further pit or other surface for engaging the corresponding detent mechanism 38 to releasably fix the second sprocket wheel sleeve 30 relative to the shaft 24.

The shaft also preferably includes a first closure pit 40 on the shaft between the first and second pits, for the detent mechanisms 36 and 38, respectively, and colinear therewith. The first detent mechanism 36 engages the first closure pit 40 when the first sprocket wheel sleeve 26 is moved axially toward the second sprocket wheel support. Engagement by the first detent mechanism 36 with the first closure pit 40 axially fixes the first sprocket wheel sleeve 26 relative to the shaft 24 and also relative to the second sprocket wheel sleeve 30. The shaft further includes a second closure pit 42, between the pits corresponding to the detent mechanisms 36 and 38, for engagement by the second detent mechanism 38 when the second sprocket wheel sleeve has moved inwardly toward the first sprocket wheel sleeve 26. Engagement by the second detent mechanism 38 with the second closure pit 42 axially fixed the second sprocket wheel sleeve 30 relative to the first sprocket wheel sleeve 26. When the first and second sprocket wheel sleeves 26 and 30, respectively, have been moved inwardly toward each other, the sprocket wheel supports have the configuration shown in FIG. 2. The first and second detent mechanisms 36 and 38, respectively, then engage the first and second closure pits 40 and 42, respectively. The first open pit 44 is then unoccupied and the second open pit 46 is also unoccupied, in the preferred embodiment.

Axially spaced apart from the first sprocket wheel 32 is a second sprocket wheel 48 supported by the second sprocket wheel sleeve and having a second dimension, namely its diameter, different from the first diameter of the first sprocket wheel 32. In the preferred embodiment, the second sprocket wheel 48 has dimensions corresponding to a sprocket wheel for engaging conventional 35 mm film having a frame pitch of 4 perforations per frame. The dimensions and characteristics for the second sprocket wheel 48 are shown in Table I. A matching second sprocket wheel 50 is mounted to the first sprocket wheel sleeve 26 spaced apart from the matching first sprocket wheel 34 and also spaced apart from the second sprocket wheel sleeve 30. The matching second sprocket wheel 50 has the identical dimensions and characteristics as the second sprocket wheel 48. In the preferred embodiment shown in FIGS. 1 and 2, the second sprocket wheels 48 and 50 are spaced from their respective adjacent first sprocket wheels 34 and 32, by a distance corresponding to one-half the distance separating the opposing faces 52 and 54 on the sprocket wheel sleeves 30 and 26, respectively. In this configuration, movement of both the first and second sprocket wheel sleeves 26 and 30, respectively, axially toward each other so that the corresponding detent mechanisms 36 and 38 engage their corresponding closure pits 40 and 42, respectively, aligns the second sprocket wheels 48 and 50 with the perforations in 35 mm film so that the second sprocket wheels can engage and drive conventional 35 mm film having a film frame pitch of 4 perforations per frame. In this configuration, the convertible sprocket assembly can accomodate 35 mm film having two different film frame pitches, namely 2.5 perforations per frame with the first sprocket wheels 32 and 34 and 4 perforations per frame with the second sprocket wheels 48 and 50. Other film formats can be accommodated simply by using different sprocket wheel dimensions and configurations. Additional sprocket wheels for other 35 mm formats may be accommodated by suitable placement of detent mechanisms and retaining surfaces therefor.

An additional pair of sprocket wheels 56 and 58 are mounted on respective sprocket wheel sleeves 26 and 30, respectively, and spaced relative to their adjacent sprocket wheels 50 and 48 such that when the first and second sprocket wheel sleeves 26 and 30 are moved toward each other to be adjacent. The distance between the sprocket wheels 56 and 58, when moved together, are such as to accommodate 70 mm film having 5 perforations per film frame. In this configuration, the convertible sprocket assembly can accommodate at least three different film formats. A 5 perforation pitch may be useful in anamorphic formats.

In the configuration of the sprocket assembly 20 shown in FIG. 1, the second sprocket wheel 48 is axially movable relative to the first sprocket wheel sleeve 26 so that the first sprocket wheel 32 engages the film 22 when the second sprocket wheel is in a first position, shown in FIG. 1, relative to the first sleeve 26. The second sprocket wheel 48 engages film having a different film format from that accommodated by the first sprocket wheel 32 when the second sprocket wheel 48 is in a second position, shown in FIG. 2, relative to the first sleeve 26. While the convertible sprocket 20 shown in FIGS. 1 and 2 includes matching sprocket wheels for the first sprocket wheel 32 and for the second sprocket wheel 48, it should be understood that matching sprocket wheels may not be necessary.

In a further embodiment of the convertible sprocket assembly of the present invention, a convertible sprocket assembly 60 (FIGS. 3-8) is configured to accommodate operation with two or more film formats. The convertible sprocket assembly 60 includes a sprocket drive shaft 64 for supporting a first sprocket wheel support or sprocket wheel sleeve 66 for supporting a sprocket wheel 68 having a first diameter for engaging the film 62 using a first film format. In the specific embodiment considered herein, the first sprocket wheel 68 is sized and configured to include ten teeth for engaging film having a film frame pitch of 2.5 perforations per frame. A key 70 assures rotational alignment of the sleeve 66 with the shaft 64. The key 70 extends in a corresponding key way, one in the surface of the shaft 64 and another in the interior surface of the sleeve 66. The sleeve 66 is axially fixed on the shaft 64 by a set screw 72.

The sprocket wheel assembly includes a second sprocket wheel support or sleeve 74 axially slidable along the shaft but rotationally aligned with the shaft by the key 70 engaging corresponding key ways in the interior surface of the sleeve 74 and the external surface of the shaft 64. A matching sprocket wheel 76 has dimensions and a configuration identical to the first sprocket wheel 68 for engaging the film corresponding to the configuration of the first sprocket wheel 68. The matching sprocket wheel 76 is positioned on the second sleeve 74 so that the sprockets 68 and 76 engage the perforations on 35 mm film when the second sleeve 74 is spaced apart from the first sleeve 66 in the position shown in FIG. 3.

A detent mechanism 76 releasably fixes the second sleeve 74 at its outboard axial position on the shaft 64 as shown in FIGS. 3 and 5. A second sprocket wheel 78 having a second diameter different from that of the first sprocket wheel 68 is supported by the second sleeve 74 for rotation with the shaft 64. The second sprocket wheel 78 is axially movable relative to the first sprocket sleeve 66 and the first sprocket wheel 68 to the configuration of the sprocket wheel assembly shown in FIG. 7 where the facing surfaces of the sleeve 66 and 74 are substantially abutting. With the second sprocket wheel moved closer to the first sleeve 66, the second sprocket wheel 78 is positioned inboard to engage the perforations of a film strip 80 having a film format conforming to the configuration of the second sprocket wheel 78. For example, in the embodiment of the convertible sprocket assembly shown in FIGS. 3-8, the second sprocket wheel 78 is configured and dimensioned to accommodate standard 35 mm film having a frame pitch of 4 perforations per film frame.

In the outboard configuration, where the second sprocket wheel is in the first position (FIG. 3) relative to the first sprocket sleeve, the first sprocket wheel 78 and the matching sprocket wheel 76 engage the film strip 62 wherein the film strip 62 has a frame pitch of 2.5 perforations per frame. When the second sprocket wheel is axially moved inboard to the second position (FIG. 7), relative to the first sprocket wheel 66, the second sprocket wheel engages the film 80 to operate with the film 80 in the conventional matter. In this configuration, the convertible sprocket assembly has a plurality of axially spaced-apart sprocket wheels 68, 76 and 78, wherein at least two of the sprocket wheels, namely 68 and 78, have different diameters for accommodating film of different formats.

Considering the adjustment mechanism in more detail, with respect to FIGS. 3 and 5-7, the shaft includes a first pit 82 (FIG. 7) for accommodating the detent mechanism 76 when the second sleeve 74 is in the outboard position. A second pit 84 (FIGS. 3 and 5) is located a distance inboard from the first pit 82 a distance corresponding to the distance between the matching sprocket wheel 76 and the second sprocket wheel 78. Therefore, when the second sleeve 74 is moved inboard relative to the first sprocket wheel sleeve 66, and the detent mechanism 76 engages the second pit 84, the second sprocket wheel 78 engages the new film 80, as shown in FIG. 7.

In the preferred form of the invention, the detent mechanism includes a ball detent assembly 86 including a ball 88 received in a chamber 90 and biased outwardly by a spring 92 (FIG. 5). The chamber 90 is formed in the interior surface of the second sleeve 74. In the preferred embodiment, the detent mechanism includes two ball detent assemblies, in opposite sides of the interior surface of the second sleeve. Therefore, two sets of first and second pits 82 and 84 are included on the shaft 64. Other releasable axial retaining mechanisms can be used as would be apparent to those skilled in the art.

A flange screw 94 is threaded into a correspondingly threaded outboard opening in the shaft 64 to axially retain the second sleeve 74 on the shaft during normal operation. Upon assembly of the convertible sprocket assembly, the flange screw 94 is removed and the second sleeve 74 along with the corresponding sprocket wheels and the detent mechanisms 86 are passed axially over the end of the shaft 64. The flange screw 94 is then threaded to the end of the shaft until the flange screw 94 is fully seated. The flange screw thereafter prevents removal of the second sleeve 74. In the preferred embodiment, the base of a counterbore 96 is formed deep enough so that no rubbing or contact occurs between the head of the flange screw 94 and the surface of the second sleeve 74.

It has been determined that the tooth-perforation film wrap of the 10-tooth sprocket mode is 3 perforations times two sprocket wheels, yielding an accumulated film wrap of 6 perforations for the embodiment shown in FIG. 3. The 16-tooth single sprocket wheel mode shown in FIG. 7 yields a film wrap of 5 perforations. The 16-tooth sprocket wheel mode shown in FIG. 2 would yield a film wrap of 10 perforations. Reliable film transport is achieved in either mode of operation. Additionally, use of polyester-base film is becoming more common and minimizes damage to film perforations.

The accompanying Table I shows dimensions and characteristics for operation with convertible sprocket assemblies and their corresponding film formats. Column 1 headed Perforation Pitch identifies the perforation pitch for the given film transported and determines the particular sprocket arrangement used with the film. The columns headed Sprocket Diameter and Film Speed provide the dimensions and characteristics for film transport for the given perforation pitch, with the equipment operating to record, produce or otherwise accommodate a film rate of 24 frames per second. The column headed Sprocket Ratio To 4 Perforations indicates the ratio of sprocket teeth for a sprocket wheel accommodating the conventional 4 perforation frame pitch relative to a sprocket for accommodating film having a perforation pitch identified in the first column. The data in Table 1 indicate the benefit being achieved through use of different film formats.

Figure 9:
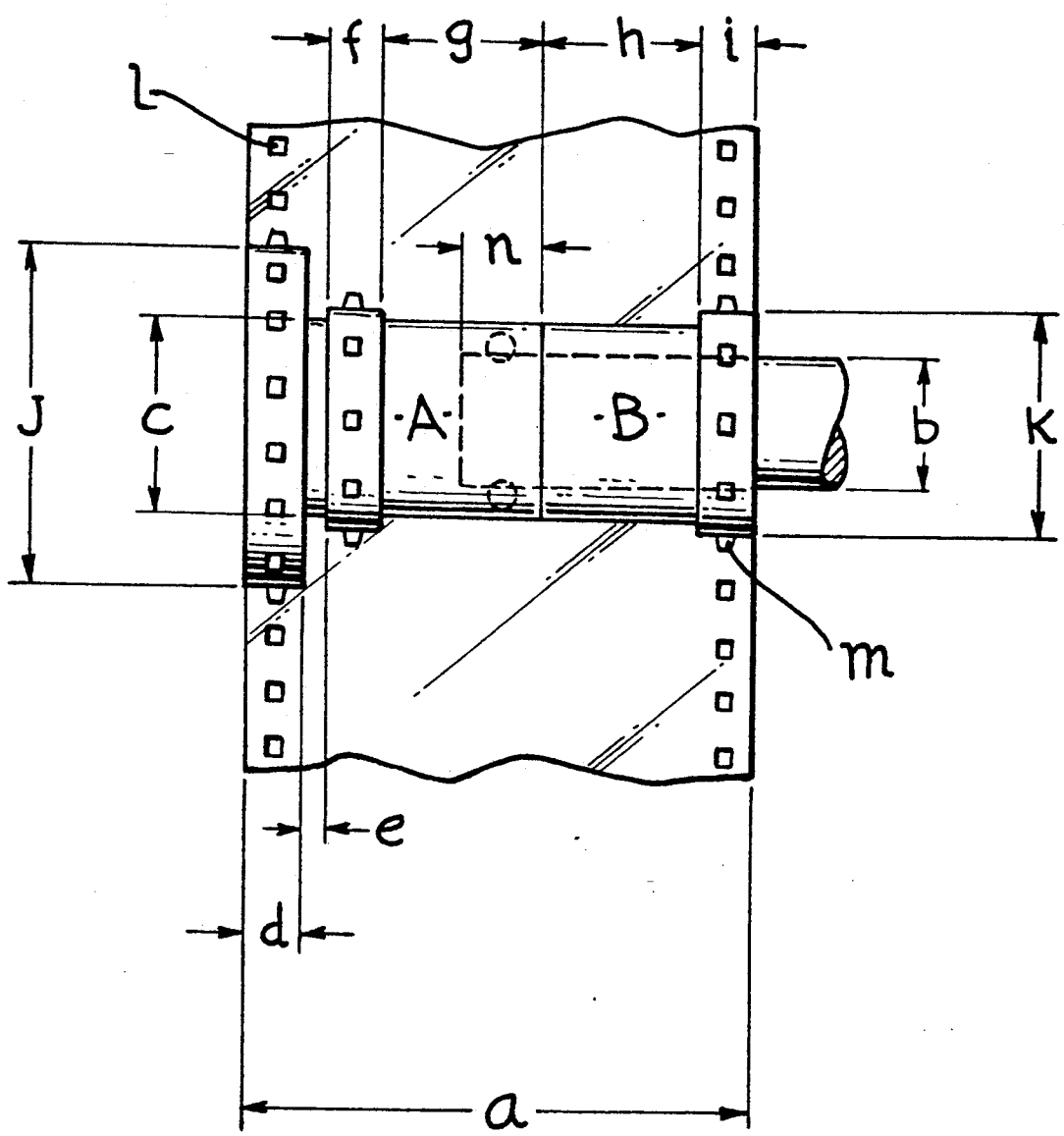
FIG. 9 is a plan view of the convertible sprocket assembly of FIG. 3 showing various relative dimensions.

Table II identifies preferred dimensions for the convertible sprocket assembly components as shown in FIG. 9. These dimensions are provided to correspond to the convertible sprocket assembly shown in FIGS. 3-8. Other dimensions for other configurations would be apparent to those skilled in the art.

The described embodiments are not limited to specific frame pitches or to specific equipment such as motion picture cameras, editing machines, projectors or other film equipment. The described embodiments are also not limited to 35 mm or other configurations of motion picture film. Other media and equipment are possible.

TABLE I

| Perf. Pitch | Frame Pitch | Sprocket Diameter | Film Speed | Sprocket Ratio To 4 Perf. | Print Length/ 111 minutes |
|---|---|---|---|---|---|
| 5 | .935" | 1.190" | 112.5'/min. | 8:10 | 12,500' |
| 4 | .748" | .952" | 90'/min. | 8:8 | 10,000' |
| 3 | .561" | .714" | 67.5'/min. | 8:6 | 7,500' |
| 2.5 | .468" | .595" | 56.25'/min. | 8:5 | 6,250' |
| 2 | .372" | .476" | 45'/min. | 8:4 | 5,000' |

TABLE II

| | DESCRIPTION | DIMENSION IN INCHES |
|---|---|---|
| a. | film width | 1.377 |
| b. | shaft diameter | .375 |
| c. | sleeve diameter | .455 |
| d. | outboard width large sprocket wheel | .106 |
| e. | space between sprocket wheels | .053 |
| f. | inboard width small sprocket wheel | .106 |
| g. | outboard sleeve width | .503 |
| h. | inboard sleeve width | .503 |
| i. | inboard width large sprocket wheel | .106 |
| j. | large sprocket diameter | .952 |
| k. | small sprocket diameter | .595 |
| l. | film perforation | .110 × .078 |
| m. | sprocket tooth | .065 × .055 × .050 |
| n. | lateral shift part A | .265 |

I claim:

1. A convertible sprocket for film and web media for accommodating different media formats, the sprocket comprising:
    a first sprocket wheel support;
    a first sprocket wheel having a first dimension and supported by the first sprocket wheel support;
    a second sprocket wheel support co-axial with the first sprocket support;
    a second sprocket wheel having a second dimension different from the first dimension and supported by the second sprocket wheel support and wherein the second sprocket wheel is axially movable relative to the first sprocket wheel support so that the first sprocket wheel engages the medium when the second sprocket wheel is in a first position relative to the first sprocket support and the second sprocket wheel engages the medium when the second sprocket wheel is in a second position relative to the first sprocket support; and
    a third sprocket wheel supported by the second sprocket wheel support for accommodating a third medium format.

2. The sprocket of claim 1 further comprising a releasable retaining mechanism for keeping the first and second sprocket wheel axially fixed relative to each other during normal operation.

3. The sprocket of claim 2 wherein the retaining mechanism includes a detent assembly.

4. The convertible sprocket of claim 3 wherein the detent includes at least one ball detent assembly.

5. The convertible sprocket of claim 4 wherein the second sprocket wheel is fixed to the second sprocket wheel support and wherein movement of the second sprocket wheel is achieved by movement of the second sprocket wheel support and wherein the detent mechanism extends between the second sprocket wheel support and a shaft to axially fix the second sprocket wheel support relative to the shaft.

6. The convertible sprocket of claim 4 wherein the ball detent mechanism includes two ball detent mechanisms oriented relative to each other on opposite sides of the shaft.

7. The convertible sprocket of claim 1 wherein the second sprocket wheel is larger than the first sprocket wheel.

8. The convertible sprocket of claim 7 wherein the second sprocket wheel is positioned further away from the first sprocket wheel when the first sprocket wheel is in the first position relative to the first sprocket support, and wherein the second sprocket wheel is relatively closer to the first sprocket wheel when the second sprocket wheel is in the second position relative to the first sprocket support.

9. The convertible sprocket assembly of claim 7 further comprising a mating sprocket wheel having the first dimension corresponding to the first sprocket wheel.

10. The convertible sprocket of claim 9 further comprising a mating sprocket wheel for the second sprocket wheel having the second dimension.

11. The convertible sprocket of claim 1 wherein the first sprocket wheel moves relative to the second sprocket wheel support.

12. The convertible sprocket of claim 11 wherein the first sprocket wheel support further includes a mating sprocket wheel corresponding to the second sprocket wheel and wherein the second sprocket wheel support includes a mating sprocket wheel corresponding to the first sprocket wheel, and wherein the first and second sprocket wheel supports are moved toward each other to accommodate a different medium format.

13. The convertible sprocket of claim 12 further comprising a detent mechanism for releasably fixing the first sprocket wheel support relative to a shaft and a detent mechanism for relatively fixing the second sprocket wheel support relative to the shaft.

14. The convertible sprocket of claim 13 wherein the detent mechanisms include ball detent assemblies.

15. The convertible sprocket of claim 1 wherein the first sprocket wheel support supports a second sprocket wheel and a third sprocket wheel, and wherein the second sprocket wheel support supports a first mating sprocket wheel corresponding to the first sprocket wheel on the first sprocket support, wherein the second sprocket corresponds to the second sprocket wheel on the first sprocket wheel support, and wherein the second sprocket wheel support further includes a third mating sprocket wheel corresponding to the third wheel on the first sprocket support for accommodating a third film medium.

16. The convertible sprocket of claim 1 wherein the first sprocket wheel is axially spaced apart from the second sprocket wheel and wherein the first and second sprocket wheels have different diameters.

17. A convertible sprocket for film and web media for accommodating different media formats, the sprocket comprising:
    a first sprocket wheel support;
    a first sprocket wheel having a first dimension and supported by the first sprocket wheel support;

a second sprocket wheel support co-axial with the first sprocket support and a second sprocket wheel having a second dimension different from the first dimension and wherein the first and second sprocket wheels are axially spaced apart; and a third sprocket wheel supported by the second sprocket wheel support for accommodating a third medium format.

18. A convertible sprocket for film and web media for accommodating different media formats, the sprocket comprising:

a shaft;

a first sprocket wheel support;

a first sprocket wheel mounted to the first sprocket wheel support and having a first dimension;

a second sprocket wheel support co-axial with the first sprocket support and rotationally fixed relative to the shaft and axially movable from a first sprocket wheel support position on the shaft to a second sprocket wheel support position on the shaft relative to the first sprocket wheel support;

a second sprocket wheel having a second dimension different from the first dimension and supported by the second sprocket wheel support;

a third sprocket wheel supported by the second sprocket wheel support for accommodating a third medium format; and a detent mechanism for releasably fixing the second sprocket wheel support relative to the shaft.

* * * * *